United States Patent [19]

Marsh et al.

[11] Patent Number: 5,170,266
[45] Date of Patent: Dec. 8, 1992

[54] MULTI-CAPABILITY FACSIMILE SYSTEM

[75] Inventors: Robert M. Marsh, Berkeley; Mark Potts; Timothy J. Hill, both of San Francisco; Kamal Mortoza, Sunnyvale, all of Calif.

[73] Assignee: Document Technologies, Inc., Mountain View, Calif.

[21] Appl. No.: 482,270

[22] Filed: Feb. 20, 1990

[51] Int. Cl.$^5$ ............................................. H04N 1/04
[52] U.S. Cl. .................................. 358/468; 358/402; 358/403; 358/426; 379/100
[58] Field of Search ............... 358/402, 403, 425, 426, 358/468, 408, 440; 379/100, 96, 97, 98

[56] References Cited

U.S. PATENT DOCUMENTS

| | | | |
|---|---|---|---|
| 2,874,213 | 2/1959 | Beers | 178/5.6 |
| 3,553,367 | 1/1971 | Krauss et al. | 178/50 |
| 3,726,992 | 4/1973 | Eguchi et al. | 178/5.6 |
| 3,813,483 | 5/1974 | Kurosawa et al. | 178/6 |
| 4,086,620 | 4/1978 | Bowen et al. | 358/260 |
| 4,558,369 | 12/1985 | Shinehara et al. | 379/100 |
| 4,586,086 | 4/1986 | Ohzeki | 358/256 |
| 4,607,289 | 8/1986 | Kurokawa | 358/257 |
| 4,651,221 | 3/1987 | Yamaguchi | 358/260 |
| 4,663,671 | 5/1987 | Seto | 358/260 |
| 4,675,863 | 6/1987 | Paneth et al. | 370/60 |
| 4,695,945 | 9/1987 | Irwin | 364/200 |
| 4,727,538 | 2/1988 | Furchtgott et al. | 370/85 |
| 4,775,893 | 10/1988 | Ishikawa | 358/261.1 |
| 4,796,091 | 1/1989 | Nohtomi | 358/256 |
| 4,809,169 | 2/1989 | Sfarti et al. | 364/200 |
| 4,994,926 | 2/1991 | Gordon et al. | 358/402 |
| 5,016,115 | 5/1991 | Calkins | 358/402 |
| 5,057,937 | 10/1991 | Muyamatsu et al. | 358/426 |
| 5,065,254 | 11/1991 | Hishida | 358/402 |

OTHER PUBLICATIONS

A. N. Netravali and B. G. Haskell, *Digital Pictures*, Plenum Press, 1988, Chap. 6.
OCITT vol. VII-Fascicle VII.e, "Terminal and Protocols for Telematic Services", 8th Plenary Assembly, Malaga-Torremolinos, 8-19 Oct. 1984, pp. 1-48.

Primary Examiner—Edward L. Coles, Sr.
Assistant Examiner—Fan Lee
Attorney, Agent, or Firm—Schneck & McHugh

[57] ABSTRACT

A multi-channel and multi-capability facsimile system including $N(\geq 2)$ signal-carrying facsimile channels, an image server means to process, store and retrieve document image information, and a master processing unit to control the process by which information is transferred between a facsimile channel and the image server means, and to enable and disable data compression and expansion document image information that is provided to or received from the facsimile channels. The system: (1) allows visual display of document pages sent and/or received in the resolution in which the document is originally received or generated; (2) allows transmission, receipt and storage of document image information and speech or voice signals; (3) allows control of the destination address and route used for transmitted document and speech infomation, using the DTMF touch tone signaling available with a telephone; (4) supports CCITT group 2, Group 3 and Group 4 standards.

14 Claims, 4 Drawing Sheets

FIG._1.

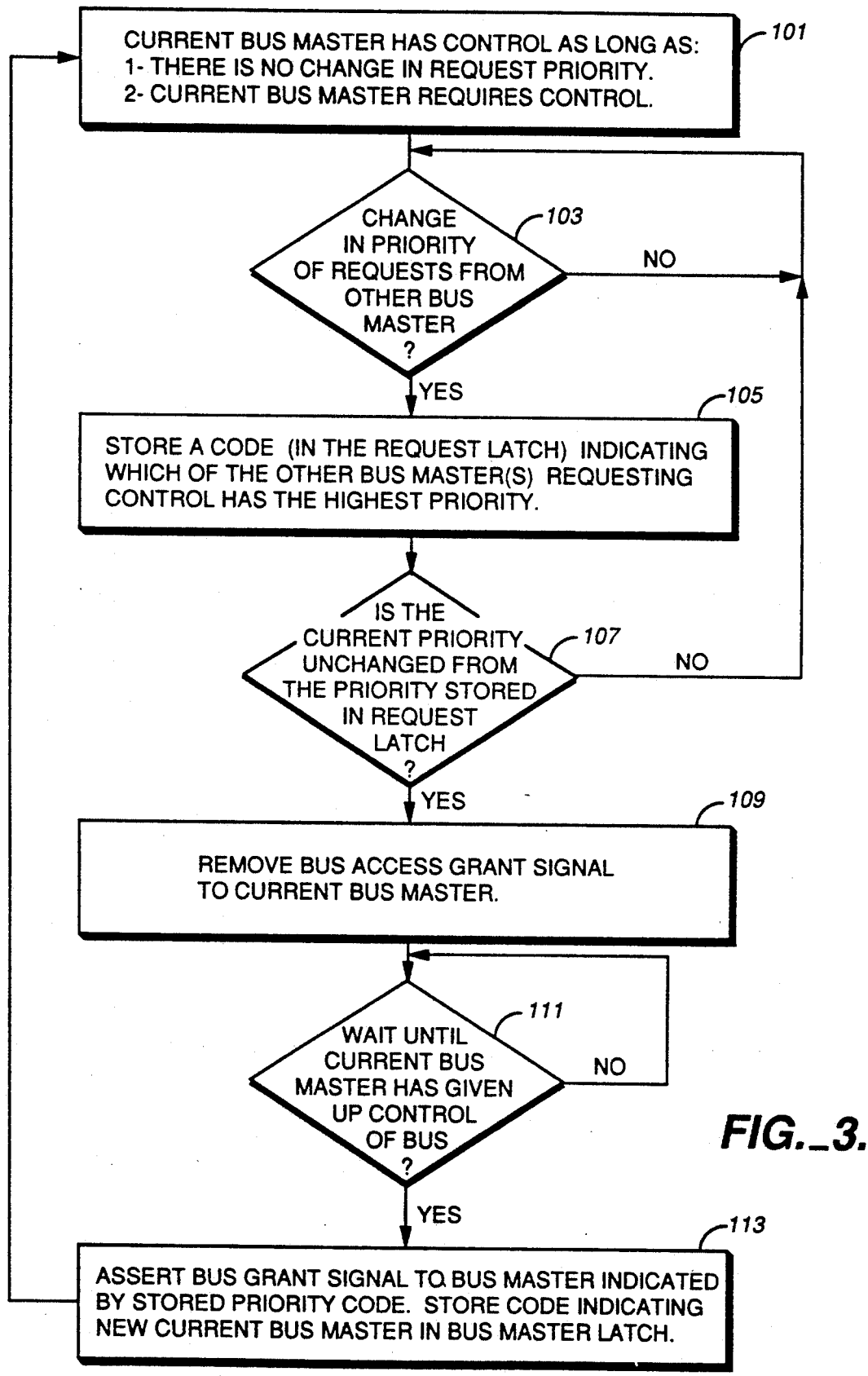
FIG._3.

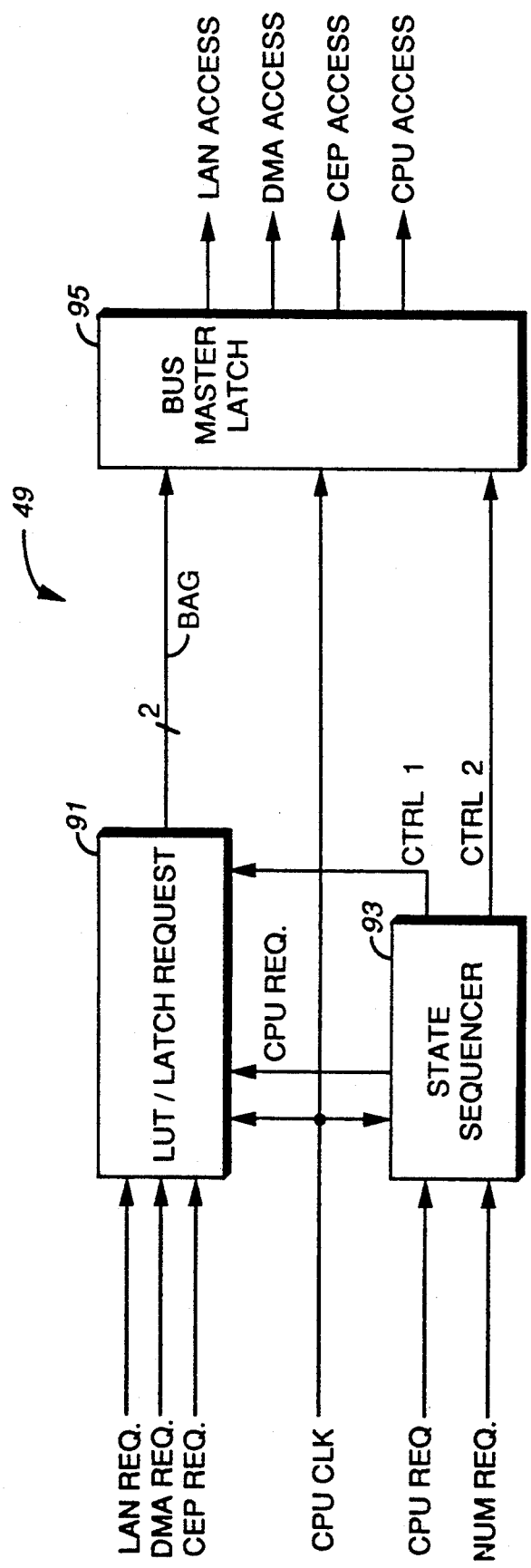
FIG._4.

MULTI-CAPABILITY FACSIMILE SYSTEM

FIELD OF THE INVENTION

This invention relates to facsimile apparatus that can perform a number of ancillary tasks substantially simultaneously, including independent transmission and receipt of document image facsimile signals on a plurality of parallel channels.

BACKGROUND OF THE INVENTION

The technology to transmit electrical signals over a wire onto paper is believed to have been first developed by Alexander Bain, as disclosed in a patent issued to Bain in 1842. This technology has been used by newspapers to transmit text and photographs for many decades. However, facsimile or "fax" technology has been made available to, and used generally by, the public only since the 1960s, when the CCITT convened and subsequently agreed on a series of fax transmission standards, now called Group 1, Group 2, Group 3 and Group 4.

The earliest of the Group 1 fax machines operated as much as a 300 bit per second modem would operate and required six minutes to send a single page. Group 2 fax machines, introduced in the mid-1970s, improved the resolution and cut transmission time to about three minutes per page.

In 1980, the CCITT approved a Group 3 standard, which calls for transmission at up to 9600 bits per second and uses digital image scanning and data compression methods to achieve these high rates. The nominal resolution for a Group 3 fax machine is 200 dots per inch ("dpi"), and a typical transmitted page in normal resolution (203 dpi×98 dpi) requires 15-20 seconds to transmit on an uncluttered telephone line. If the page is transmitted in the "fine" mode, the resolution increases to 203 dpi×196 dpi and the time required to transmit a page approximately doubles. If the fax machine has built-in gray scale processing capability, the transmission time per page increases approximately exponentially with the number of bits used for gray scale processing. The Group 4 facsimile standard, approved by the CCITT in January 1988, requires use of a leased or other error-free telephone line or of an integrated services digital network ("ISDN"). Transmission rates of up to thirty pages per minute at up to 400 dpi resolution are available with the Group 4 standard.

In 1966, Magnavox developed the first acoustically coupled facsimile machine, the Magnafax 840, which was marketed for business and office applications. This machine used a Group 1 standard and transmitted all the information on an 8.5×11 inch sheet in about six minutes.

Multiplex transmission of facsimile signals and television images is disclosed by Beans in U.S. Pat. No. 2,874,213, using the television vertical blanking interval to transmit the facsimile information. A similar approach is disclosed by Weinstein et al. in U.S. Pat. No. 3,491,199 and by Eguchi et al. in U.S. Pat. No. 3,726,992. Krauss et al., in U.S. Pat. No. 3,553,367, discloses multiplexing of two different facsimile signals using amplitude modulation and phase modulation alternatingly to modulate an audio frequency carrier signal.

Other workers have developed special purpose facsimile systems. Kurosawa et al., in U.S. Pat. No. 3,813,483, discloses a facsimile system that uses two scanners to simultaneously scan a pair of parallel bands across a sheet to be transmitted. The two information streams from these two scanners are each used to modulate a carrier signal, with one carrier signal being shifted 90 degrees in phase relative to the other carrier signal, and the two modulated signals are combined in a mixer and sent through a signal line such as a telephone line. The process is reversed at the other end in order to demodulate and restore the original two signals, which are used to reproduce the page of information scanned at the transmitting end.

In U.S. Pat. No. 4,086,620, Bowen et al. discloses the use of a digital signal processor that permutes a stream of image pixel values to increase the run length (maximum length of consecutive black or consecutive white spaces in a line) to increase the efficiency of run length encoding of messages.

Facsimile relay systems that use store-and-forward for error monitoring at the source facsimile station or for conventional relay purposes are disclosed by Oheki in U.S. Pat. No. 4,586,086 and by Kurokawa in U.S. Pat. No. 4,607,289.

Use of buffer memories to receive and temporarily store facsimile signals for data compression and de-compression, television image reproduction and similar purposes are disclosed in U.S. Pat. No. 4,651,221 issued to Yamaguchi, in U.S. Pat. No. 4,663,671 issued to Seto, and in U.S. Pat. No. 4,775,893 issued to Ishikawa.

Furchtgott et al., in U.S. Pat. No. 4,727,538, discloses use of a processor, and a co-processor, together with a data buffer, to allow transmission of data stored in the buffer or, alternatively, transmission of data read directly from memory. Use of a co-processor to run software independently of software being run in the host processor and loadable by the host processor, is disclosed by Irwin in U.S. Pat. No. 4,695,945.

Paneth et al., in U.S. Pat. No. 4,675,863, disclose provision of a plurality of speech channels, data channels or facsimile channels for transmission of signals over telephone lines. Different channels in a telephone trunk line may be used by different subscribers.

In U.S. Pat. No. 4,796,091, Nohtomi discloses a facsimile system that includes a communications terminal, a modem, a memory to temporarily store information that has been received and demodulated by the modem, a display unit to temporarily and selectively display information received, and a recording module to selectively record information received by the terminal. Information received by the terminal is automatically stored in the memory and is then confirmed by the visual display module as required. If any portion of the information received is to be recorded for permanent retention, the recording module is activated and information recording proceeds as required. The modem, memory, display module and recording module appear to operate in a serial manner under the control of a macrocomputer master processing unit ("MPU").

Sfarti et al. disclose use of a plurality of co-processors, operating in parallel and having a plurality of execution modes, in U.S. Pat. No. 4,809,169. The co-processor array requires little, if any, managerial support from the host processor other than activation of each co-processor at appropriate times to perform that co-processor's designated task. The system implements a priority scheme to coordinate execution of the various co-processor tasks.

Each of these systems appears to use a single processor or an array of processors to control transmission, receipt and processing of information through a single signal transmission line. What is needed is a system that allows transmission, receipt and processing of information on each of a plurality of signal-carrying channels at high transfer rates and with the best available resolution.

SUMMARY OF THE INVENTION

These needs are met by apparatus that includes two or more signal-carrying (fax) channels, for transmission and receipt of facsimiles of document image information, and an image server module having an input terminal and an output terminal, to receive, process and store information from each of the signal-carrying channels and to retrieve and process information to be provided for transmission on one or more of the signal-carrying channels. Each signal-carrying fax channel includes a modem, a signal-carrying line and a data acquisition adapter ("DAA") that provides an acceptable interface of the user's fax channel to the common carrier's signal-carrying line. The image server module also has an expansion-compression co-processor to convert information received from a signal-carrying channel in compressed form to an expanded or de-compressed form for use by the image server module and to convert the information contained in the image server module to a compressed form for transmission by a signal-carrying channel.

The image server module further includes a display monitor such as a CRT that can display for visual perception an image of a page of text and/or graphics received in the native CCITT-specified resolution; that is, in the same resolution as received by the signal-carrying channel. The image server module further includes a large memory, preferably fast random access, and a central processing unit, for receiving processing and storing document image information and for providing such information to a master processing unit, discussed below, for transmission on one or more of the signal-carrying channels.

The apparatus also includes a master processing unit connected to each of the signal-carrying channels and to the image server module, to control the process by which information is exchanged between each signal-carrying channel and the image server module, and for enabling and disabling operation of the expansion/compression co-processor, where the master processing unit, the image server module and each signal-carrying channel are connected to each other by a bi-directional data channel. The master processing unit functions somewhat as another co-processor for the image server to handle exchange of document image information between the plurality of signal-carrying channels and the image server module.

The apparatus also contains a first buffer for temporarily holding a large number $M_1$ of units of information for exchange between the master processing unit and the image server module, and a second buffer for temporarily holding a small number $M_2 (<<M_1)$ of units of information for exchange between the master processing unit and one or more of the signal-carrying channels. The two buffers provide flow control of information exchanged by the master processing unit with the image server module or with one or more of the fax channels. One or both of these two buffers may be a random access memory that serves the master processing unit.

The facsimile system also includes DTMF signaling capability, for touch tone signaling by use at a telephone, that allows a facsimile user to enter a sequence of numerical parameters either at one time or interactively in response a sequence of information requests. This sequence of numerical parameters can be used to specify the destination of the document image information transmitted by the user, the route (e.g., through a switching circuit) to be followed for the transmission, or for other related purposes.

The facsimile system allows transmission of facsimiles representing voice or speech information, in addition to document image information, where the two types of information may be distinguished by use of a different leader or flag that is received at or transmitted by a modem in one of the signal-carrying channels of the system. The facsimile system supports use of the CCITT Group 2, Group 3 and Group 4 standards.

BRIEF DESCRIPTION OF THE DRAWINGS

FIGS. 2 and 4 are plan views of some features contained in the image server shown in FIG. 1.

FIG. 3 is a diagram illustrating bus access arbitration logic.

BEST MODE FOR CARRYING OUT THE INVENTION

Figure 1:
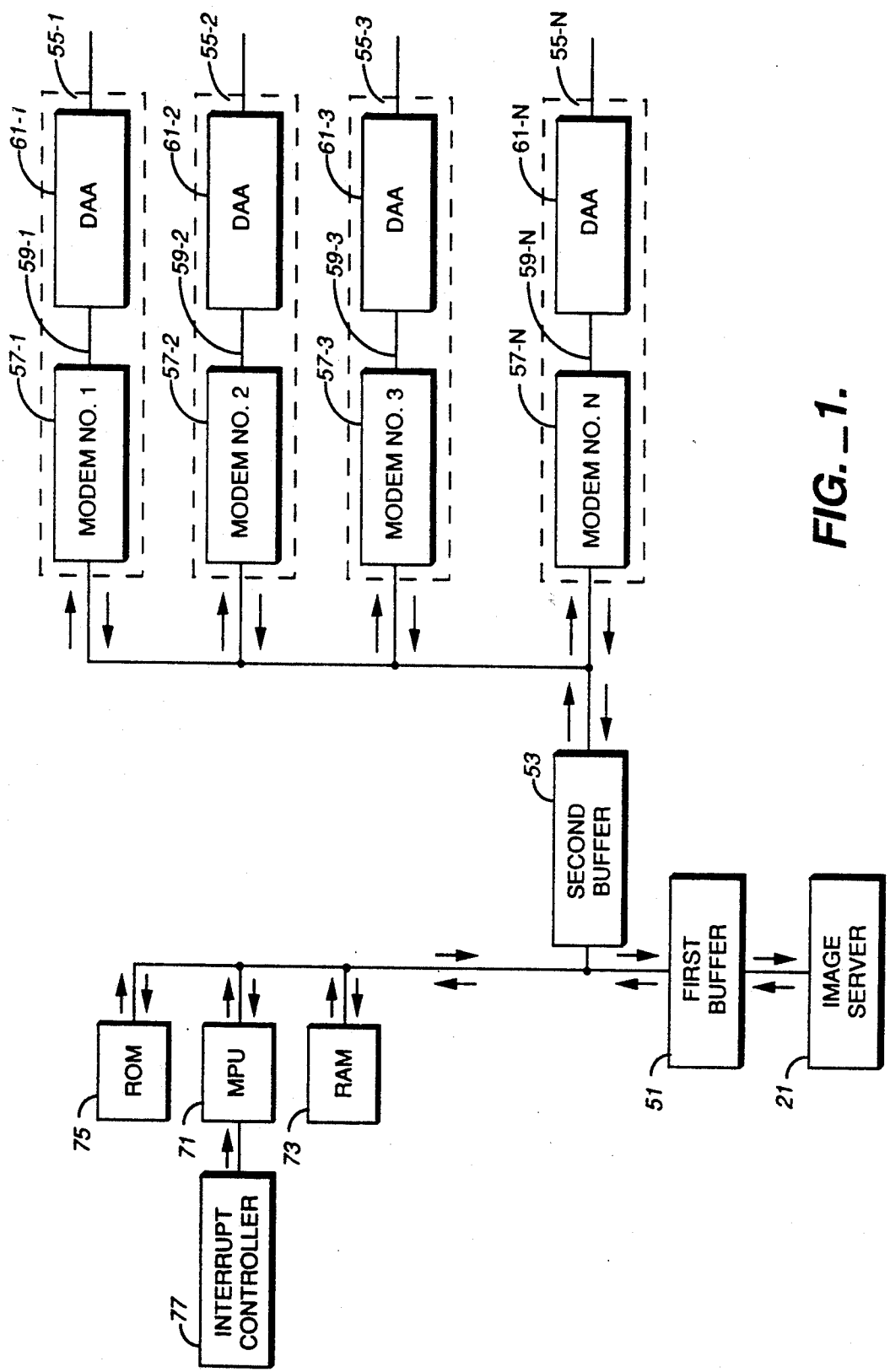
FIG. 1 is a plan view of one embodiment of the invention.

With reference to FIG. 1, an image server module 21 is provided to store, process and retrieve document image information received from or provided to certain signal-carrying channels ("fax channels") 55-$i$ ($i=1, 2, \ldots, N$) that include a modem 57-$i$, a signal-carrying line 59-$i$ and a data acquisition adapter 61-$i$ for each channel. The signal-carrying channels independently carry facsimiles of document images between the system shown in FIG. 1 and destinations or sources of such signals.

The image server 21 has an expansion-compression co-processor 31 as a part of or associated with the module 21 that compresses data according to a predetermined data compression algorithm when such data are called for by one of the signal-carrying channels or "fax" channels 55-$i$ ($i=1, 2, \ldots, N$), for reasons discussed below. The expansion-compression co-processor 34 also receives data in compressed form from one of the fax channels 55-$i$ and decompresses such data so that it is in normal format for storage in the image server module 21. The image server module 21 also has a random access memory for storage of document information data and of computer processing instructions for such data and has a central processing unit for monitoring and controlling the operations performed by other devices that are a part of or associated with the image server module 21.

A modem 57-$i$ ($i=1, 2, \ldots, N$) of a channel 55-$i$ will receive a bit stream representing document image or voice image information from another facsimile station and pass it to the expansion-compression co-processor 35 associated with the image server module 21 for decoding, or will receive an encoded bit stream from the co-processor 31 for transmission to another facsimile station. Each data acquisition adaptor ("DAA") 61-$i$ provides an acceptable interface with the signal line of the common carrier (telephone company or similar organization) that will carry signals between facsimile stations.

The image server 21 will serve as a host processor and should include a central processing unit 31, an image server memory 33, an image display controller 35 and associated visual display device such as a CRT 37, and an expansion-compression co-processor 39 as noted above.

The image display controller receives document image information from image server memory 35 or from one of the signal-carrying channels 55-$i$ and converts this information to a form suitable for display on the display monitor 37. The document image displayed on the monitor 37 is presented in the "native CCITT-specified Group 3 resolution," which is the resolution of the image received under a CCITT Group 3 standard on the image-carrying channel 55-$i$ or of the image contained in the image server memory 33. This is a unique feature of the system. Other facsimile systems convert the facsimile image received under a Group 3 standard, to a different, lower resolution that is not the original resolution of the image received.

Figure 2:
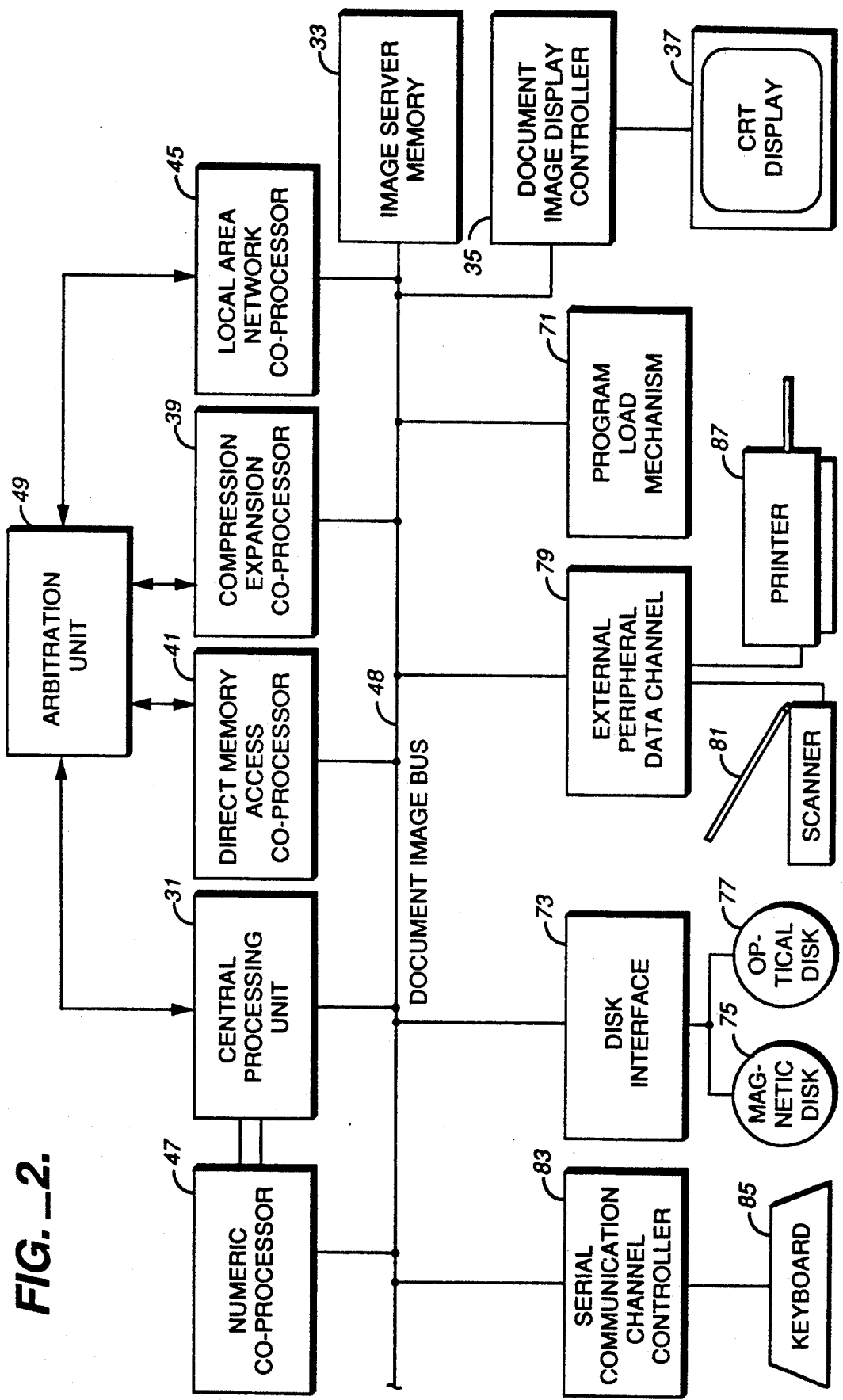

Optionally, the image server module 21, shown in more detail in FIG. 2, may also include one or more other co-processors, each [f which independently performs certain functions related to transmission and receipt of facsimile images. These optional co-processors include a direct memory access co-processor 41, a data transport co-processor 43 to format and transfer image data between the central processing unit and other co-processors and peripheral devices associated with the image server module 21; a network or LAN c-processor 45 to receive data from, and transfer data to one or more broadcasting stations in a network of such stations to which the system shown in FIG. 1 belongs; a-d a numerical co-processor 47 to receive selected data from the memory within the image server module 21, to perform predetermined numerical operations on such data, and to issue the results of such operations as output signals.

Operation of the image server module 21 is discussed at greater length in "Co-processor System for Image Display," U.S. Ser. No. 07/335,918, filed Apr. 10, 1989, and assigned to the assignee of this application.

In FIG. 2, a plurality of special function co-processors are provided to perform, in parallel and independently, groups of related tasks that a central processing unit ("CPU") would ordinarily perform. The system 21 includes the CPU 31, a random access memory 33, a direct memory access co-processor 41 for data transport (optional), a CEP co-processor 39, a numerical co-processor 47 (optional), an image display controller 35, a network co-processor 45 (optional), a document image bus 48 that connects all these devices, and a bus access arbitration unit 49.

The CPU 31 receives, monitors and controls the signals that are issued by one or more of the co-processors, controllers or memory and received by another of these devices. The CPU 31 performs various housekeeping and control functions that are not otherwise performed by the co-processors, by the controllers or by the arbitration unit 49.

The CPU 31 is responsible for issuing commands to one or more of the co-processors in order to perform a given image processing operation. Until a command is issued to a co-processor by the CPU 31, that co-processor is quiescent. Commands from the CPU 31 to a co-processor are issued either through the memory 33 or through control signals carried on the document image bus 48, or both; and upon receipt of such command the target co-processor will awaken and perform the requested operation. Upon completion of a command or sequence of commands by a co-processor, the co-processor sends a task-completed control signal to the CPU through either the memory 33 or the bus 48, or both. Interacting with the co-processors in this manner, the CPU 31 coordinates co-processor operations in a non-conflicting manner.

The random access memory 33 receives, transmits and stores image data and computer processing instructions for such data; such instructions are received from a program load memory 71. The program load memory 71 preferably includes a "boot" or read-only memory ("ROM") to provide instructions to the system upon power-up. The memory 33 has a capacity of between 524,288 and 16,777,216 8-bit bytes. One embodiment is organized into 1,048,576 16-bit words and has a read/write data access time of 120 nanoseconds ("nsec").

The direct memory access co-processor ("DMA") 41 is used for data transport and can move blocks of image data, control signal data, etc., of a size that can be handled by the CPU 31, between and among the memory 33 and internal and external peripheral devices for subsequent processing and/or display. The DMA 41 performs its functions by: (1) rapidly transferring a block or image or other data from one set of locations in memory 33 or in the memory of an image display controller 35 ("IDC"), discussed below, to another set of such memory locations; or (2) by rapidly transferring a block or image or other data to or from internal or external peripheral devices using a standardized interface channel or using small computer system interfaces ("SCSIs") 73.

The CEP co-processor 39 receives image data from the memory and expands or compresses this data by various operations and issues the expanded or compressed data as output signals for use by the remainder of the system. The CEP co-processor 39 has two primary functions, each of which works by independently accessing the memory 33. The first task of the CEP co-processor 39 is document image data compression, which is performed by reading image data from one set of locations in the memory 33 or in the memory of the IDC 35, then filtering these data using a data compression algorithm that is compatible with CCITT standardized Group 3 and Group 4 facsimile communication protocols or using another suitable algorithm, and then placing the resulting compressed data into another set of locations in the memory 33. The second task of the CEP co-processor 39 is expansion or de-compression of compressed image data to its original document image format. This operation is performed as the inverse of the image data compression by reading the compressed image data from one set of locations in memory 33, and filtering these data using a data expansion algorithm that is compatible with CCITT Group 3 and Group 4 protocols or another suitable algorithm, and then writing the resulting expanded document image data into another set of locations in memory or into the memory of IDC 35.

The numerical co-processor ("NUM") 47, which is optional in the preferred embodiment, performs predetermined numerical operations on this data and issues the results of such numerical operations as output signals to the CPU 31.

The image display controller 35 receives image data from the memory 33, converts these data to a predetermined format for display, and issues these reformatted data as output signals that are received by a CRT or other display monitor 37 for display of a page of the document.

The network co-processor ("LAN") 45 is connected to the document image bus 48 to receive data from, and transmit data to, one or more broadcast stations in a network of such stations, such as a local area network, to which the apparatus belongs. The LAN 45 independently accesses the memory 33 to obtain control information and data. The LAN 45 receives and transmits image and other data from/to other network stations by an Ethernet-compatible local area network to which the LAN co-processor 45 is attached. The LAN co-processor 45 is capable of directly accessing both uncompressed document image data in the display memory of the IDC 35 and the compressed image data previously stored in the memory 33 by the CEP 39 or retrieved from magnetic disk 75 or optical disk 77 storage units (optional) attached to the apparatus.

The document image bus 48 is connected to the CPU 31, to the memory 33 and to all the co-processors and controllers of the system in order to transfer signals therebetween, as controlled by the CPU 31 and by the bus access arbitration unit 49.

The arbitration unit 49 is connected to all of the co-processors to receive bus access requests from the CPU 31, the memory 33 and the various co-processors, to resolve potential conflicts where two or more of these devices attempt to simultaneously gain access to another of these devices. All device access requests pass through the arbitration unit 49 and are responded to on either a first-to-arrive basis or according to a preemption scheme that is contained in a look-up table that is part of the arbitration unit 49.

The system may also include the image display controller or IDC 35, an interlaced raster scan CRT display 37, an input/output channel controller (optional) and a disk storage input/output channel controller 79 (optional) that are also connected to the document image bus 48. The input/output controller 79 may include an interface with a document image scanner 81 (optional), an interface 83 for control by a keyboard 85 (optional) and an interface for control of an image printer 87 (optional) that supplements display of the image by the high resolution display monitor 37. The disk storage input/output channel controller 73 may include modules for control of Winchester disks, optical WORM disks and other mass storage devices.

The IDC 35 comprises several elements: (1) a document image memory array ("DIMA") that is large enough to store one or more full page documents at the chosen resolution; for example, an 8.5×11 inch page stored at 200 dots per inch resolution requires a memory with a capacity of at least $3.74 \times 10^6$ bits; (2) a timing generator that coordinates the actions of the other elements and generates the synchronization signals required by the display monitor 37 and; (3) a serializer that converts bits read in parallel from the DIMA into a sequential bit stream that is suitable for transmission to the display monitor 37. The display monitor 37 connected thereto should be capable of displaying a full page monochrome document image upon receipt of the display data from the serializer.

The bus access arbitration unit ("AU") 49 receives access requests from, and arbitrates and assigns access to, four devices, listed in order of decreasing priority: (1) the network co-processor 47 ("LAN"); (2) the data transport or direct memory access co-processor 41 ("DMA"); (3) the CEP co-processor 39; and (4) the CPU 31, which has the lowest priority. Assume that the AU 49 has granted access to the bus 48 to one of these devices that has priority P1 and that no other device has yet requested access. If a bus access request from a second device, having priority P2 is received by the AU 49, the AU will compare the two priorities P1 and P2 and take the following action: (1) if priority P2 is higher, the first device will be allowed to finish its current cycle of operations using the bus 48 and will then relinquish the use of the bus to the second device; (2) if priority P1 is higher, the first device will be allowed to continue to use the bus 48 until the earliest of the following two events occurs: (2a) the first device finishes its current run of processing and relinquishes use of the bus or (2b) the cumulative time for which the first device has used the bus 48 for the current run of processing exceeds a predetermined number of cycles of operation that is specific to the first device, after which the first device relinquishes use of the bus to the next device in the queue. If a third device requests access to the bus, after the bus access request by the second device but before the second device has gained access to the bus, the second device will be allowed to use the bus for at least one cycle of its operations and the above analysis of actions based on priorities will apply to the second and third devices. This provides a first come-first served system, with time of bus access limited by priority and by a predetermined upper bound $C_u$ on the number of operating cycles that is specific to each device. For the AU 49, the upper limits $C_u$ on time interval for bus access, measured in cycles, varies from 1 to 255 cycles for each of the four devices. Additionally, after one of these devices has relinquished bus access, that device must wait for a predetermined number $C_L$ of cycles before requesting bus access again; the number $C_L$ for each of the four devices also varies from 1 to 255 cycles.

FIG. 3 schematically illustrates the logic procedure followed by the AU 49 in arbitrating and granting bus access requests Assume one of the four devices, CPU 31, DMA 41, CEP 39 and LAN 45, has access to the bus; the device having access is referred to as the "current bus master". This is represented by the first step 101 in FIG. 3. Assume the AU 49 receives a bus access request from another of these devices At step 103, the inquiry is: Does the second device priority P2 exceed the priority P1 of the current bus master? If not, the AU 49 ignores the bus access request of the second device, until the first device relinquishes bus access, and recycles to box 103 again. If the priority P2 exceeds the priority P1, the AU 49 proceeds to step 105 and stores the highest priority that is currently in the bus access queue in a bus access request latch. The AU then proceeds to step 107 and determines whether the newly-received priority P2 is now the highest priority in the request latch ("yes"), or if the request latch already contained a priority higher than P2 ("no"). If the answer is "no", the AU 49 recycles to step 103. If the answer is "yes", the AU 49 moves to step 109, where the control request signal is set so that device no. 1, which currently has bus access, will relinquish bus access (step 111). If device no. 1 has not yet acknowledged receipt of this signal ("no"), the AU 49 recycles to step 111. One operating cycle after device no. 1 has acknowledged receipt of the signal, this device relinquishes bus access, which now passes to the device with the highest priority that is requesting bus access (step 113).

The CPU 31 and the DMA 41, CEP 39 and LAN 45 co-processors share a common parallel set of address, control signal and data signal lines; so that these four devices use the same method for accessing the memory and peripheral devices of the apparatus. Each of these devices can independently move blocks of image data from one location to another. The DMA 41, CEP 39 and LAN 45 may each have an independent memory.

The numerical co-processor 47 can also request access to the bus 48. However, access for this co-processor 47 is controlled by and through the CPU 31, and these two devices share the same priority, namely that of the CPU, in access to the bus 48.

With reference to FIG. 4, the arbitration unit 49 comprises an LUT/request latch module 91, a state sequencer module 93 and a bus master latch 95. The state sequencer module 93 submits its bus access request to the LUT/request latch module 91, which also receives bus access requests from the CEP 39, the DMA 41 and the LAN 45 and arbitrates and assigns bus access in a manner discussed above. The LUT/request latch module 91 then issues a two-bit bus access grant signal ("BAG") that is received by the bus master latch module 95. The module 95 decodes the two-bit BAG signal and grants access to the bus to the CPU 31, the CEP 39, the DMA 41 or the LAN 45 as required by the BAG signal. The LUT/request latch module 91, the state sequencer module 93 and the bus master latch module 95 each receive a CPU clock signal that determines the time of turnover of bus access and provides time sequencing for other purposes.

The state sequencer 93 provides a first control signal CTRL1 for the LUT/request latch module 91 when the device requesting bus access has higher priority than the device, if any, that currently has bus access. The state sequencer provides a second control signal CTRL2 for the bus master latch module 95 when the holder of bus access has relinquished access to the bus.

The image server 21 in FIG. 2 may be operated in a pipelined mode if a series of repetitive processing operations is required. Assume that a series of image processing operations is required to be performed on, say, two consecutive rows (1 and 2) of image data by co-processors A, B, C, . . . in that order before the processed data are passed to the image display controller 35 and/or the CRT 37 for subsequent display. The first group of data from rows 1 and 2 to be processed could be sent to co-processor A, processed by A, then sent to co-processor B; while co-processor B performs its operations, group 2 of the data could be sent to co-processor A to be processed by A in parallel with processing of the group 1 data by A; when A and B have finished their operations, the group 1 data can be sent to co-processor C (assuming C is not identical with A or B) for further processing by C, the group 2 data can be sent to B for further processing, and group 3 of the data can be sent to A for initial processing. Operating in this manner, the image server 21 can process the image data in parallel through use of simultaneously operating co-processors that perform independent and different processing functions, with all parallel operations being directed by the CPU 31, acting as a "traffic cop" for the flow of processed data.

The facsimile system shown in FIG. 1 also includes a master processing unit ("MPU") 71 that communicates directly with and controls operation of the image server module 21 and the fax channels 55-$i$ (i=1, 2, . . . , N), by means of bidirectional signal lines as shown. The MPU 71 has associated therewith a high speed random access memory 73 to receive and process data and control signals received from other parts of the system, and a read-only memory or ROM 75 that contains control instructions and other firmware for monitoring of and management of the facsimile system. The MPU 71 also has associated therewith an interrupt controller 77 for controlling the timing of and reaction to interrupt signals that are received from time to time by the MPU 71.

The facsimile system shown in FIG. 1 is also provided with a first buffer of relatively large size containing $M_1$ units of information (e.g., 32–8,192 Kbytes) to receive and temporarily store certain information that is exchanged between the MPU 71 and the image server module 21. The facsimile system shown in FIG. 1 also includes a second buffer of much larger size, containing a smaller number $M_2$ of units of information (e.g., 8–8,192 bytes) that allows flow control of data exchanged between the MPU 71 and any of the fax channels 55-$i$. The first and second buffers serve as first in, first out ("FIFO") registers to aid in controlling the rate of flow of information between the MPU 71 and the image server module 21 and each signal-carrying channel 55-$i$ in the system. Each buffer preferably has a read/write time of the order of 100 nsec or less. The random access memory 73 associated with the MPU 71 serves as the first buffer and can serve as the second, smaller buffer as well.

The MPU 71 may be an Intel 80386SX processor with a 16 MHz clock speed or other similar device. The RAM 73 and ROM 75 should preferably have access times of no more than 80 nsec and 200 nsec, respectively. The interrupt controller 77 may be an 8259A-2 interrupt controller or other similar device. A modem or other input-output terminal for a fax channel 55-$i$ (i=1, 2, . . . , N) may be a R96MFX fax modem chip or other similar chip.

The apparatus as shown in FIG. 1 incorporates the CCITT Group 3 standard and can operate at 2400, 4800, 7200 or 9600 bit/sec. However, if a particular fax channel is communicating with a system that conforms to a lower standard such as the CCITT Group 2 standard, the facsimile system shown in FIG. 1 can automatically reduce its bit rate to conform to the lower standard.

This facsimile system also supports the CCITT Group 4 standard, which requires use of a modified data compression, an error-free signal line and a transmission rate of up to 64 Kbits/sec. At such a transmission rate, facsimile transmission of a page of text requires about 18 sec. Using the Group 3 and 4 standards, a facsimile system of the type disclosed here can receive a fax transmission locally under the Group 3 standard, store and reformat the image to comply with the Group 4 standard, and transmit the image under the Group 4 standard to a remote facsimile system using an error-free line. The receiving facsimile system can then store and reformat the image under the Group 3 standard and re-transmit the image locally under the Group 3 standard. The image is transmitted long distance under the Group 4 standard, but is received locally and re-distributed locally (at either end) under the Group 3 standard.

The CCITT Group 3 and Group 4 standards require use of one-dimensional and two-dimensional data compression and de-compression for transmission and receipt, respectively, and are discussed in A. N. Netravali and B. G. Haskell, *Digital Pictures,* Plenum Press, 1988, Chap. 6, and in the "Red Book", CCITT Volume VII-Facsicle VII.3, "Terminal Equipment and Protocols for Telematic Services", 8th Plenary Assembly, Malaga-Torremolinas, Oct. 8-19, 1984, pp. 2-48. These two references are incorporated herein by reference.

The facsimile system shown in FIG. 1 provides a multi-channel, multi-capability facsimile transmission with N channels, including two buffers for bit rate or flow control. A facsimile channel has critical real time requirements, and these requirements are satisfied by one or more of the co-processors associated with the image server module 21, thus relieving the host processor (MPU 43) to perform other control and monitoring tasks. The system thus provides multiple, parallel, asynchronous modem channels for transmission and receipt of document image information for facsimile purposes.

The facsimile system also includes DTMF signaling capability, for touch tone signaling by use at a telephone, that allows a facsimile user to enter a sequence of numerical parameters either at one time or interactively in response a sequence of information requests. This sequence of numerical parameters can be used to specify the destination of the document image information transmitted by the user, the route (e.g., through a switching circuit) to be followed for the transmission, or for other related purposes.

The facsimile system allows transmission of facsimiles representing voice or speech information, in addition to document image information, where the two types of information may be distinguished by use of a different leader or flag that is received at or transmitted by a modem in one of the signal-carrying channels of the system. The facsimile system supports use of the CCITT Group 2, Group 3 and Group 4 standards.

The system can be used as a stand-alone facsimile system, or as a system that supports fax store-and-forward, fax format translation, fax broadcasting and fax relay. The system can also serve as a fax-to-computer gateway with reformatting capability. The software or firmware is layered so that portions run on the host processor and other independent portions run on one or more of the co-processors.

We claim:

1. Multiple channel facsimile apparatus that allows transmission, receipt and processing of facsimiles of document image information on two or more signal-carrying channels independently of one another and display of such information, the apparatus comprising:
   a plurality of N($\geq$2) signal-carrying channels for transmission and receipt of a facsimile of document image information,
   image server means having an input terminal and an output terminal, for processing and storage of document image information in digital form from each of the signal-carrying channels, and for retrieval and processing of document image information to be provided for transmission on one or more of the signal-carrying channels, the image server means further having a memory for receipt, storage and provision of document image information and computer processing instructions therefor in digital form, with the same resolution with which document image information is received from a signal-carrying channel, having a central processing unit to perform and control processing operations on document image information received from a signal-carrying channel and from the image server means memory, and having an expansion-compression co-processor to convert information received from a signal-carrying channel in compressed form to a de-compressed form for use by the image server means, and to convert document image information contained in the image server means memory to a compressed form for transmission on a signal-carrying channel;
   image display means connected to the image server means, for receiving document image information from the image server means and from a signal-carrying channel and for visually displaying this information with the same resolution in which such information is received;
   master processing means connected to each signal-carrying channel and to the image server means, for controlling the rate at which information is exchanged between each signal-carrying channel and the image server means, and for enabling and disabling operation of the expansion-compression co-processor, with the master processing means, the image server means and each signal-carrying channel being connected to each other by a bi-directional data line;
   a first data buffer connected to the master processing means, for temporarily holding a large number M1 of units of document image information for exchange between the image server means and the master processing means;
   a second data buffer connected to the master processing means, for temporarily holding a small number M2 of units of document image information for exchange between the master processing means and one or more of the signal-carrying channels.

2. The apparatus of claim 1, wherein said first buffer is a random access memory connected to and controlled by said master processing means and said number M1 of said units of information is in the range of 32-8,192 kilobytes of digital information.

3. The apparatus of claim 1, wherein said second buffer is a random access memory connected to and controlled by said master processing means and said number M2 of information is in the range of 8-8,192 bytes of digital information.

4. The apparatus of claim 1, wherein at least one of said signal-carrying channels includes a digital signal-carrying line and includes a modulator-demodulator, connected to said master processing means and to the signal-carrying line, to allow exchange of document image information in digital form between said signal-carrying channel and said master processing means.

5. The apparatus of claim 4, wherein said image server means and at least one of said signal-carrying channels support transmission and receipt of document image information that complies with any of a CCITT Group 2 standard, Group 3 standard or Group 4 standard.

6. The apparatus of claim 1, wherein said image server means further comprises:
   a data transport co-processor for data transport and management, to transfer image information data between said central processing unit and peripheral devices;
   a document image bus connected to said image server means memory and central processing unit, to the data transport co-processor, to said expansion-compression co-processor and to said image display means, to transfer signals between these devices; and arbitration means connected to the document image bus, for receiving bus access requests from the central processing unit, from the image display means, and from any of the co-processors, for resolving potential conflicts where more than one of these devices attempt to simultaneously gain access to the bus, and for granting bus access to one of these devices at a time, based upon a separate bus access priority assigned to said central processing unit, to said image display means and to each co-processor.

7. The apparatus of claim 1, wherein said apparatus belongs to a network of facsimile devices and said image server means further comprises:
a network co-processor to receive data from, and transfer data to, one or more broadcast stations in a network of facsimile stations to which the apparatus belongs;
a document image bus connected to said image server means memory and central processing unit, to the network co-processor, to said expansion-compression co-processor and to said image display means, to transfer signals between these devices; and
arbitration means connected to the document image bus, for receiving bus access requests from the central processing unit, from the document image display means, and from any of the co-processors, for resolving potential conflicts where more than one of these devices attempt to simultaneously gain access to the bus, and for granting bus access to one of these devices at a time, based upon a separate bus access priority assigned to said central processing unit, to said image display means and to each co-processor.

8. Multiple channel facsimile apparatus that allows transmission, receipt and processing of facsimiles of document image information and speech information on two another and display of such information, the apparatus comprising:
a plurality of N($\geq$2) signal-carrying channels for transmission and receipt of a facsimile of document image and speech information;
image server means having an input terminal and an output terminal, for processing and storage of document image and speech information in digital form from each of the signal-carrying channels, and for retrieval and processing of document image and speech information to be provided for transmission on one or more of the signal-carrying channels, the image server means further having a memory for receipt, storage and provision of document image and speech information and computer processing instructions therefor in digital form, with the same resolution with which such information is received from a signal-carrying channel, having a central processing unit to perform and control processing operations on document image and speech information received from a signal-carrying channel and from the image server means memory, and having an expansion-compression co-processor to convert information received from a signal-carrying channel in compressed form to a de-compressed form for use by the image server means, and to convert document image and speech information contained in the image server means memory to a compressed form for transmission by a signal-carrying channel;
image display means connected to the image server means, for receiving document image information from the image server means and from a signal-carrying channel and for visually displaying this information with the same resolution in which such information is received;
master processing means connected to each signal-carrying channel and to the image server means, for controlling the rate at which information is exchanged between each signal-carrying channel and the image server means, and for enabling and disabling operation of the expansion-compression co-processor, with the master processing means, the image server means and each signal-carrying channel being connected to each other by a bi-directional data line;
a first data buffer connected to the master processing means, for temporarily holding a large number M1 of units of document image and speech information for exchange between the image server means and the master processing means;
a second data buffer connected to the master processing means, for temporarily holding a small number M2 of units of document image and speech information for exchange between the master processing means and one orm ore of the signal-carrying channels.

9. The apparatus of claim 8, wherein said first buffer is a random access memory connected to and controlled by said master processing means and said number M1 of said units of information is in the range of 32-8,192 kilounits bytes of digital information.

10. The apparatus of claim 8, wherein said second buffer is a random access memory connected to and controlled by said master processing means and said number M2 of said units of information is in the range of 8-8,192 bytes of digital information.

11. The apparatus of claim 8, wherein at least one of said signal-carrying channels includes a digital signal-carrying line and includes a modulator-demodulator, connected to said master processing means and to the signal-carrying line, to allow exchange of document image and speech information in digital form between said signal-carrying channel and said master processing means.

12. The apparatus of claim 11, wherein said imager server means and at least one of said signal-carrying channels support transmission and receipt of document image information that complies with any of a CCITT Group 2 standard, Group 3 standard or Group 4 standard.

13. The apparatus of claim 8, wherein said image server means further comprises:
a data transport co-processor for data transport and management, to transfer image information and speech data between said central processing unit and peripheral devices;
a document image bus connected to said image server means memory and central processing unit, to the data transport co-processor, to said expansion-compression co-processor and to said image display means, to transfer signals between these devices; and
arbitration means connected to the document image bus, for receiving bus access requests from the central processing unit, from the image display means, and from any of the co-processors, for resolving potential conflicts where more than one of these devices attempt to simultaneously gain access to the bus, and for granting bus access to one of these devices at a time, based upon a separate bus access priority assigned to said central processing unit, to said image display means and to each co-processor.

14. The apparatus of claim 8, wherein said apparatus belongs to a network of facsimile devices and said image server means further comprises:
- a network co-processor to receive data from, and transfer data to, one or more broadcast stations in a network of facsimile stations to which the apparatus belongs,
- a document image bus connected to said image server means memory and central processing unit, to the data transport co-processor, to said expansion-compression co-processor and to said image display means, to transfer signals between these devices, and
- arbitration means connected to the document image bus, for receiving bus access requests from the central processing unit, from the document image display means, and from any of the co-processors, for resolving potential conflicts where more than one of these devices attempt to simultaneously gain access to the bus, and for granting bus access to one of these devices at a time, based upon a separate bus access priority assigned to said central processing and central processing unit, to the network co-processor, to said expansion-compression co-processor and to said image display means.

* * * * *

UNITED STATES PATENT AND TRADEMARK OFFICE
CERTIFICATE OF CORRECTION

PATENT NO. : 5,170,266

DATED : December 8, 1992

INVENTOR(S) : Robert M. Marsh et al.

It is certified that error appears in the above-indentified patent and that said Letters Patent is hereby corrected as shown below:

In the drawings, in Fig. 2, "DATA TRANSPORT CO-PROCESSOR 43" should be added to connect "ARBITRATION UNIT 49" and "DOCUMENT IMAGE BUS 48".

Column 2, line 19, "Oheki" should read - - Ohzaki - -.

Column 4, line 40, "image server 21" should read - - image server module 21 - -.

Column 4, line 41, "co-processor 31" should read - - co-processor 39 - -.

Column 4, line 47, "34" should read - - 39 - -.

Column 4, line 61, "35" should read - - 39 - -.

Column 4, line 63, "co-processor 31" should read - - central processing unit 31 - -.

Column 5, line 8, "image server memory 35" should read - - image server memory 33 - -.

Column 5, line 23, "each [f which" should read - - each of which - -.

Column 5, line 30, "LAN c-processor" should read - - LAN co-processor - -.

Column 5, line 31, "transfer data to one" should read - - transfer data to, one - -.

Column 5, line 33, "a-d" should read - - and - -.

UNITED STATES PATENT AND TRADEMARK OFFICE
CERTIFICATE OF CORRECTION

PATENT NO. : 5,170,266
DATED : December 8, 1992
INVENTOR(S) : Robert M. Marsh et al.

It is certified that error appears in the above-indentified patent and that said Letters Patent is hereby corrected as shown below:

Column 5, line 47, "random access memory" should read
-- image server memory --.

Column 6, line 9, "random access memory" should read
-- image server memory --.

Column 7, line 36, "controller (optional)" should read
-- controller, not shown and optional, --.

Column 7, lines 37-38, "controller 79 (optional)" should read
-- controller 73 --.

Column 7, line 39, "input/output controller" should read
-- peripheral data channel --.

Column 8, line 40, "requests Assume" should read -- requests. Assume --.

Column 10, line 16, "larger" should read -- smaller --.

Column 11, line 13, "MPU 43" should read -- MPU 71 --.

Claim 1, column 11, line 49, "N ($\geq$2)" should read -- N --.

Claim 3, column 12, line 42, "of information" should read
-- of said units of information --.

Claim 5, column 12, line 52, "and at least one" should read
-- and said at least one --.

UNITED STATES PATENT AND TRADEMARK OFFICE
CERTIFICATE OF CORRECTION

PATENT NO. : 5,170,266

DATED : December 8, 1992

INVENTOR(S) : Robert M. Marsh et al.

It is certified that error appears in the above-indentified patent and that said Letters Patent is hereby corrected as shown below:

Claim 8, column 13, line 38, "two another" should read -- two or more signal-carrying channels independently of one another --.

Claim 8, column 13, line 40, "N (≥2)" should read -- N --.

Claim 8, column 14, line 26, "one orm ore" should read -- one or more --.

Claim 9, column 14, line 32, "kilounits bytes" should read -- kilobytes --.

Claim 12, column 14, line 47, "and at least one" should read -- and said at least one --.

Columns 12 and 13, claim 6 should read as follows:

6. The apparatus of claim 1, wherein said image server means further comprises:
a data transport co-processor for data transport and management, to transfer image information data between said central processing unit and peripheral devices;
a document image bus connected to said image server means memory and central processing unit, to the data transport co-processor, to said expansion-compression co-processor and to said image display means, to transfer signals therebetween; and
arbitration means connected to the document image bus, for receiving bus access requests, for resolving potential conflicts relative to the bus, and for granting bus access based upon access priorities.

UNITED STATES PATENT AND TRADEMARK OFFICE
CERTIFICATE OF CORRECTION

PATENT NO. : 5,170,266

DATED : December 8, 1992

INVENTOR(S) : Robert M. Marsh et al.

It is certified that error appears in the above-indentified patent and that said Letters Patent is hereby corrected as shown below:

Column 13, claim 7 should read as follows:

7. The apparatus of claim 1, wherein said apparatus belongs to a network of facsimile devices and said image server means further comprises:
   a network co-processor to receive data from, and transfer data to, one or more broadcast stations in a network of facsimile stations to which the apparatus belongs;
   a document image bus connected to said image server means memory and central processing unit, to the network co-processor, to said expansion-compression co-processor and to said image display means, to transfer signals therebetween; and
   arbitration means connected to the document image bus, for receiving bus access requests, for resolving potential conflicts relative to the bus, and for granting bus access based upon access priorities.

Column 14 and 15, claim 13 should read as follows:

13. The apparatus of claim 8, wherein said image server means further comprises:
   a data transport co-processor for data transport and management, to transfer image information and speech data between said central processing unit and peripheral devices;
   a document image bus connected to said image server means memory and central processing unit, to the data transport co-processor, to said expansion-compression co-processor and to said image display means, to transfer signals therebetween; and
   arbitration means connected to the document image bus, for receiving bus access requests, for resolving potential conflicts relative to the bus, and for granting bus access based upon access priorities.

UNITED STATES PATENT AND TRADEMARK OFFICE
CERTIFICATE OF CORRECTION

PATENT NO. : 5,170,266

DATED : December 8, 1992

INVENTOR(S) : Robert M. Marsh et al.

It is certified that error appears in the above-indentified patent and that said Letters Patent is hereby corrected as shown below:

Column 15 and 16, claim 14 should read as follows:

14. The apparatus of claim 8, wherein said apparatus belongs to a network of facsimile devices and said image server means further comprises:
   a network co-processor to receive data from, and transfer data to, one or more broadcast stations in a network of facsimile stations to which the apparatus belongs,
   a document image bus connected to said image server means memory and central processing unit, to the network co-processor, to said expansion-compression co-processor and to said image display means, to transfer signals therebetween, and
   arbitration means connected to the document image bus, for receiving bus access requests, for resolving potential conflicts relative to the bus, and for granting bus access based upon access priorities assigned to said central processing and central processing unit, to the network co-processor, to said expansion-compression co-processor and to said image display means.

Signed and Sealed this

Thirteenth Day of September, 1994

*Attest:*

BRUCE LEHMAN

*Attesting Officer*  *Commissioner of Patents and Trademarks*